UNITED STATES PATENT OFFICE.

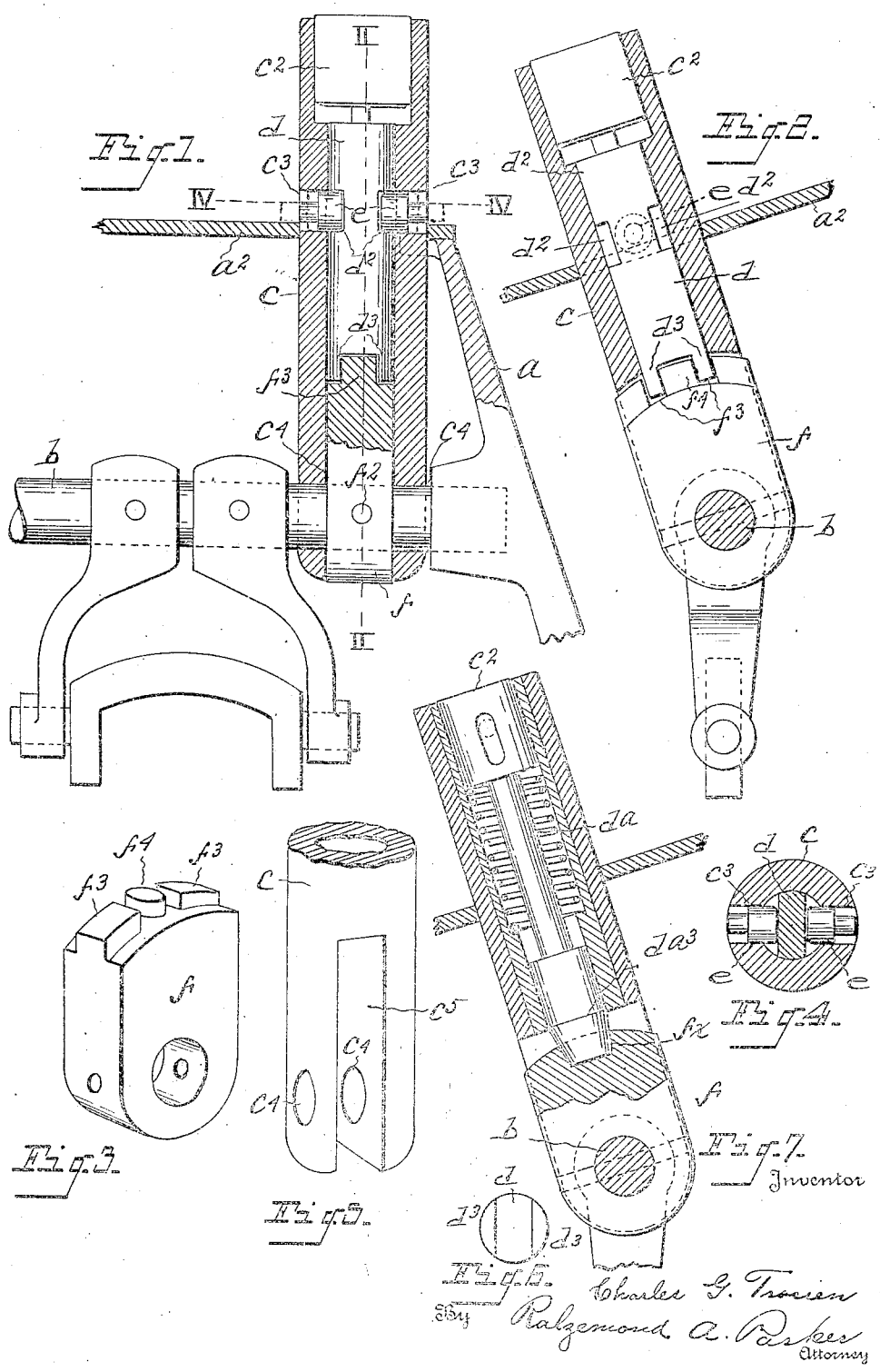

CHARLES G. TROSIEN, OF PONTIAC, MICHIGAN.

GEAR-LOCK FOR AUTOMOBILES.

1,366,300.

Specification of Letters Patent.   Patented Jan. 18, 1921.

Application filed November 7, 1919.   Serial No. 336,406.

*To all whom it may concern:*

Be it known that I, CHARLES G. TROSIEN, a citizen of the United States, residing at Pontiac, county of Oakland, state of Michigan, have invented a certain new and useful Improvement in Gear-Locks for Automobiles, and declare the following to be a full, clear, and exact description of the same, such as will enable others skilled in the art to which it pertains to make and use the same, reference being had to the accompanying drawings, which form a part of this specification.

My invention relates to gear locks for automobiles and an object of my improvements is to provide an improved means of locking a rotating shaft which actuates the speed changing apparatus. I have shown a construction embodying my invention as applied to the change speed gearing of a Ford automobile.

Figure 1 is a detail section of a part of the change speed gear casing with an apparatus embodying my invention secured thereto.

Fig. 2 is a sectional view looking from the right of Fig. 1, the section being taken approximately on the line II—II of Fig. 1.

Fig. 3 is a perspective view of the locking cam.

Fig. 4 is a detail section on the line IV—IV, Fig. 1.

Fig. 5 is a perspective view of the lower end of the casing $c$.

Fig. 6 is an inverted plan view showing the lower end of the locking rod $d$.

Fig. 7 is a view similar to Fig. 2 showing a modified construction.

$a$ is a change speed gear casing. $a^2$ is a cover plate therefor. $b$ is a rock shaft carrying the lever arm by which the change speed gear apparatus is actuated. $c$ is a cylindrical casing slotted, as shown at $c^5$, Fig. 5, at its lower end and provided with coaxial apertures $c^4$ through which the rock shaft $d$ engages and in which it may turn.

$d$ is a rotating rod fitting in the casing $c$. $c^2$ is a pin lock apparatus by which the rod $d$ may be secured from rotation at its locked position. $d^3$ are two lugs formed on the lower end of the rod $d$ by milling out the intervening portion of said rod. $d^2$ indicate cut-away portions on opposite sides of the rod $d$.

$c^3$ indicate apertures opposite each other through the wall of the casing $c$ and opposite the milled slots $d^2$ in the rod $d$ when said rod is turned to its unlocked position. $e$ $e$ are pins fitting and adapted to reciprocate in the apertures $c^3$.

When the rod $d$ is turned to its unlocked position as shown in Fig. 1, the pins $e$, $e$ may be completely within the apertures $c^3$ and casing $c$ and the cover plate $a^2$ may be taken off the casing $a$. When the rod $d$ is turned to its locked position the pins $d$ are protruded from the apertures $c^3$ and extend over the cover plate $d^2$ as shown by dotted lines in Fig. 1, thus preventing the removal of said plate.

$f$ is a locking disk secured upon the rock shaft $d$ as by a pin $f^2$. The disk $f$ fits in the slot $c^5$ at the lower end of the cylindrical casing $c$. The outer periphery of the disk $f$ is milled to form a circular central lug $f^4$ protruding radially therefrom and two lugs $f^3$, $f^3$ spaced from the lug $f^4$. When the rod $d$ is turned to the position shown in Fig. 1, the lugs $f^3$, $f^4$ are free to pass between the lugs $d^3$. When the rod $d$ is turned about its axis 90 degrees the lugs $d^3$ engage upon both sides of the lug $f^4$, their outer surfaces engaging against the inner surfaces of the lugs $f^3$. In this position the locking disk $f$ and consequently the rock shaft $d$ is rigidly secured, preferably in neutral position of the change speed gear apparatus, and the gearing is locked.

Instead of the lugs $f^3$, $f^4$ there may be an aperture formed in the periphery of the lug $f$, as shown at $f^x$, Fig. 7, and there may be a reciprocating rod $d^x$ having its lower end $d^{xa}$ formed to engage in the cavity $f^x$, serving to lock the locking disk $f$ in the disengaged position of the gearing.

By this construction, the casing $c$ is rigidly secured from removal from the casing by the rod $d$ engaging through the aperture $c^4$.

In the unlocked position of the gearing, the cover plate $a^2$ may be removed and in the locked position of the gearing such cover plate is secured from removal.

Claims:

1. The combination of a change speed gear casing, a rock shaft therein, a lock casing extending through the change speed gear casing and engaging said shaft so as to prevent the removal of said casing and locking apparatus in said lock casing adapted to engage said shaft and prevent its turning.

2. The combination of a change speed gear casing, a lock casing extending through the wall of the change speed gear casing, said lock casing being slotted at its lower end and engaging over said shaft so as to prevent the removal of said casing, a locking disk on said shaft, fitting in the slot in said casing, a locking means in said lock casing, adapted to engage said disk and prevent the turning of said shaft.

3. The combination of a change speed gear casing, a removable cover plate therefor, a shaft in said casing, a lock casing passing through said cover plate and engaging said shaft, a rod in said lock casing adapted to engage said shaft, apertures through the wall of said lock casing about said cover plate, pins in said apertures adapted to reciprocate therein and when protruding from said slot to engage said cover plate, said locking means being constructed to cause said pins to protrude when in its locked position and permitting the pins to be drawn from said apertures when in its unlocked position.

4. The combination of a change speed gear casing, a gear actuating shaft in said casing, a lock casing protruding through the wall of said change speed gear casing, and engaging said shaft, a cam upon said shaft provided with a lug at its periphery, a rotating rod in said lock casing, adapted to engage said lug in one angular position, and to leave the lug free at another angular position.

In testimony whereof I sign this specification.

CHARLES G. TROSIEN.